United States Patent [19]
Barth

[15] 3,640,755
[45] Feb. 8, 1972

[54] COATINGS FOR AUTOMOTIVE EXHAUST GAS REACTORS
[72] Inventor: Walter J. Barth, Hockessin, Del.
[73] Assignee: E. I. du Pont de Nemours and Company, Wilmington, Del.
[22] Filed: Feb. 13, 1969
[21] Appl. No.: 798,872

[52] U.S. Cl..........................117/71 M, 29/196.2, 29/196.6, 29/197, 29/198, 117/66, 117/93.1 PF, 117/105.2
[51] Int. Cl..........................................................C23c 7/00
[58] Field of Search...........117/71 M, 93.1 PF, 105.2, 114 C, 117/66; 29/196.2, 196.6, 197, 198

[56] References Cited

UNITED STATES PATENTS

| | | | |
|---|---|---|---|
| 2,664,874 | 1/1954 | Graham | 29/196.2 X |
| 2,800,707 | 7/1957 | Whitfield et al. | 117/114 C X |
| 2,970,065 | 1/1961 | Greene et al. | 29/197 X |
| 3,129,069 | 4/1964 | Hanink et al. | 29/198 UX |
| 3,141,744 | 7/1964 | Couch et al. | 29/197 X |
| 3,226,207 | 12/1965 | Bungardt et al. | 29/197 |
| 3,481,715 | 12/1969 | Whalen | 29/197 X |
| 3,481,715 | 12/1969 | Whalen et al. | 29/196.2 |
| 3,505,028 | 4/1970 | Douthit | 29/196.2 |

Primary Examiner—Alfred L. Leavitt
Assistant Examiner—C. K. Weiffenbach
Attorney—Francis J. Crowley

[57] ABSTRACT

Process for producing sheet metal substrates having high corrosion and erosion resistance to hot exhaust gases of internal combustion engines by A. melt spraying a coating about 125–250 microns thick of a mixture of about 70–90 weight percent nickel and about 10–30 weight percent aluminum on sheet metal substrates of a chromium-iron alloy having, by weight, 10–40 percent chromium, 0–40 percent nickel, 0–10 percent manganese, 0–6 percent aluminum and 35–80 percent iron, the chromium, nickel, manganese, aluminum and iron content totaling at least 95 percent, and B. diffusion coating the nickel-aluminum coating with aluminum to a thickness of at least 25 microns; and Exhaust manifold reactor inner chambers having at least the surfaces which deflect the initial exhaust gas impingement from internal combustion engines treated by the above coating process.

7 Claims, 2 Drawing Figures

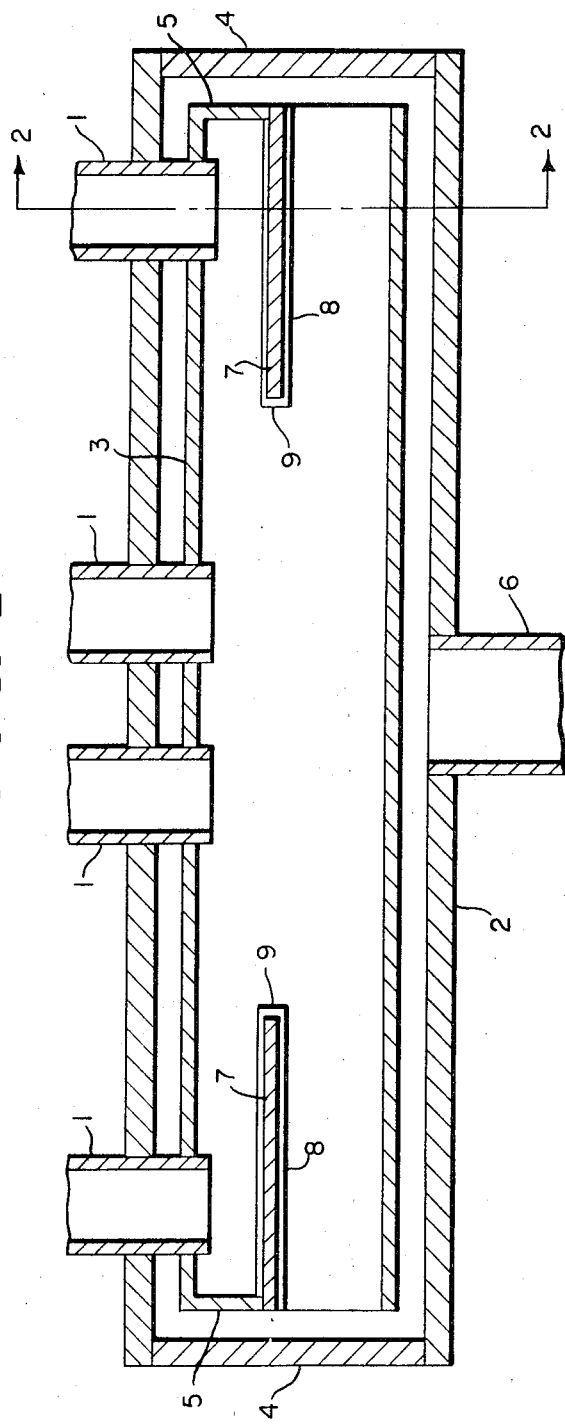
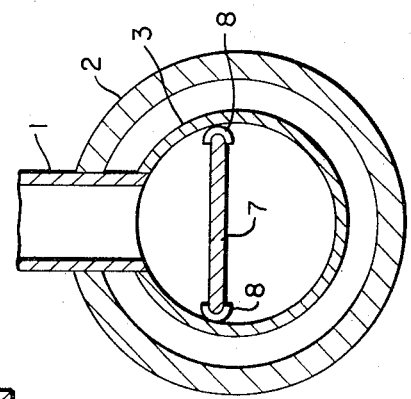

COATINGS FOR AUTOMOTIVE EXHAUST GAS REACTORS

BACKGROUND OF THE INVENTION

1. Field of the Invention

This invention relates to exhaust manifold reactors which are used to reduce atmospheric contamination by incompletely burned exhaust gases from internal combustion engines. In particular, it is especially concerned with treating surfaces of exhaust manifold reactor inner chambers which are subjected to the initial impingement of hot exhaust gases from internal combustion engines so as to render such impact surfaces less susceptible to corrosion and erosion.

2. Description of Prior Art

The exhaust gases emitted by automobiles and trucks normally contain significant quantities of hydrocarbons and carbon monoxide. In recent years, the problem of emission of unburned hydrocarbons and oxidation products by automotive vehicles has assumed greater importance with the recognition that these hydrocarbons may contribute significantly to atmospheric pollution in metropolitan areas. Considerable effort has been directed toward devising ways of operating internal combustion engines so as to reduce the amount of hydrocarbon and carbon monoxide in the exhaust gas and toward developing economical devices for treating exhaust gases to eliminate or significantly reduce the amount of hydrocarbon and carbon monoxide contained in them.

An early approach to the reduction of carbon monoxide and unburned hydrocarbon emissions was to inject air into admixture with exhaust gases from the engine (for example, Tifft in U.S. Pat. No. 2,263,318). However, these pollutants were reduced only by a small amount because the oxidizing action of the air was relatively slow and the reacting mixture was exhausted into the atmosphere before effective oxidation was accomplished.

To accelerate oxidation, with concurrent effective reduction of carbon monoxide and unburned hydrocarbon emissions, exhaust manifold reactors containing a core for reducing the content of carbon monoxide and unburned hydrocarbons in the exhaust gases of internal combustion engines were designed to attain high internal reaction temperatures, as, for example, in U.S. Pat. Nos. 3,302,394 to Pahnke and Sowards and 3,413,803 to Rosenlund and Douthit.

Such exhaust manifold reactors operate over a wide temperature range. The reactors may cycle rapidly between about 430°–480° C. during idle and about 900°–1010° C., or higher, during normal startup, cruise and deceleration, and may briefly reach 1,065° C., or higher, during rapid rich-mixture decelerations and during engine malfunction. Because of these conditions, common metals of construction tend to fail early in exhaust reactor structures.

Each of these exhaust manifold reactors has internal surfaces against which the air-injected combusted gases impinge. First failures of presently used materials occurs at these surfaces since they are exposed to the highest temperatures in the reactor and are thus subject to the greatest influence of corrosion and erosion.

Material for the reactor must have adequate strength to maintain the desired shape in thin sections at temperatures as high as 1,095° C., be resistant to scaling, spalling, erosion and other effects of high temperature oxidizing conditions, and be resistant to cracking and deformation caused by changes in crystalline structure and other metallurgical changes which may take place during heating to or cooling from elevated temperatures. The material should also be relatively inexpensive and easily fabricated. Such requirements apply to the reactor core in general.

To fit these requirements, Walter H. Douthit, in U.S. Pat. No. 3,505,028, disclosed an improved material of construction for a reactor inner chamber, the material producing a longer useful life of reactor. The material is a nonmagnetic, austenitic, iron-nickel-chromium alloy of 22–55 percent iron, less than 0.5 percent carbon, at least 10 percent chromium, and 11 percent, plus 0.7 times the amount of chromium, of nickel, the alloy having on all surfaces an aluminum containing diffusion coating containing a major amount of nickel aluminide (NiAl). NiAl is a compound having a body-centered cubic crystal structure. The diffusion coating is made by either transferring aluminum to the substrate by means of a carrier material, that is, by a pack process, or by dipping the substrate in molten aluminum and subsequently heat diffusing the layer of aluminum.

However, while the above improved material of Douthit produces a longer useful life for the reactor core in general, the zones of first failure even in Douthit's reactor core are the areas where the air-exhaust gas mixtures impinge and are first deflected in the reactor (in Douthit's FIG. 1, baffles 9 and 10 are the initial impact surfaces). In the reactor of Rosenlund and Douthit (U.S. Pat. No. 3,413,803), baffles 9 and 10 of FIGS. 1–4, as well as the extensions 50 and 51 of FIG. 5, provide such impact surfaces. In the reactor core of Pahnke and Sowards (U.S. Pat. No. 3,302,394), the surface of the reactor core opposite the gas inlet provides such areas. A more corrosion- and erosion-resistant surface is therefore needed for these zones of first failure.

It is accordingly among the objects of this invention to provide a process for increasing the resistance to corrosion and erosion by hot exhaust gases of internal combustion engines of sheet metal substrates used in such reactor cores. It is also an objective to provide a reactor core having exhaust gas impact surfaces which have enhanced resistance to corrosion and erosion.

BRIEF SUMMARY OF THE INVENTION

These objectives and others are attained according to the subject invention by:

I. Process for producing a sheet metal substrate having improved corrosion and erosion resistance to hot exhaust gases of internal combustion engines by:

A. melt-spraying a coating about 125–250 microns thick of a mixture of about 70–90 weight percent nickel and about 10–30 weight percent aluminum, by either flame-spraying or plasma jet-spraying, onto a sheet metal substrate of a chromium-iron alloy having, by weight, 10–40 percent chromium (preferably 15–25 percent), 0–40 percent nickel (preferably 28–36 percent), 0–10 percent manganese (preferably 0.25–2 percent), 0–6 percent aluminum (preferably 0–2 percent) and 35–80 percent iron (preferably 40–55 percent), and a total chromium, nickel, manganese, aluminum and iron content of at least 95 percent, and B. diffusion coating the nickel-aluminum coating with aluminum at least 25 microns thick (preferably 25–50 microns); and II. An exhaust manifold reactor chamber having at least the surfaces which deflect the initial gas impingement from the internal combustion engine treated by the above coating process.

BRIEF DESCRIPTION OF THE DRAWINGS

In the drawings,

FIG. 1 illustrates a plan view in section of a typical exhaust manifold reactor inner chamber with which the subject invention may be practiced and tested.

FIG. 2 illustrates a section of the exhaust manifold reactor of FIG. 1 taken along line 2—2 of FIG. 1.

DETAILED DESCRIPTION OF THE INVENTION

It has now been discovered according to the subject invention that a reactor core having delayed deterioration at the areas against which the air-combusted gases impinge, whether such reactor core be of the design of Rosenlund et al., Pahnke et al., Douthit or others, can be produced by applying a double coating to such areas by the special process outlined above. This process has the effect of greatly extending the useful life of the reactor core by providing an extremely hard, corrosion-, erosion-resistant coating on the alloy substrate.

The special process of this invention consists of melt spraying the most critical interior areas of a reactor core with a mixture of 70–90 percent by weight of nickel and 10–30 percent by weight of aluminum to a coating thickness of 125–250 microns and then diffusion coating that coating with an aluminum layer at least 25 microns thick.

Melt spraying of the nickel-aluminum mixture can be done by flame-spraying the mixture of metals or by plasma jet spraying the mixture.

Flame-spraying involves spraying molten metal from a flame-spray gun in which metal to be melted is continuously presented inside the gun to a burning mixture of oxygen and fuel, usually acetylene, which is ejected from the gun. Metal for flame spraying may be provided in wire form or in powder form.

Plasma jet-spraying involves spraying molten metal from a plasma gun in which metal in powder form is metered into an outflowing luminous stream of ionized gas produced by passing the gas through an electric arc. Metal temperatures up to 17,000° C. are economically attainable by such a plasma gun. A special advantage of spraying by a plasma gun as compared with the use of an oxyacetylene metal spray gun is that oxygen, combustion gas and combusted products are absent from a plasma gas stream and the spray gun is more capable of producing a sprayed coating the composition of which differs little from that of the metal before spraying.

The principles and equipment used in flame and plasma jet spraying are well described on pages 507–515 of volume 2 of the Eighth Edition of the Metals Handbook, published in 1964 by the American Society for Metals.

Melt spraying of critical internal reactor core areas can be done by directing the metal spray from the outside of the reactor core through the exhaust gas feed openings to the reactor. The area sprayable is as broad as can be covered by the projection of melt spray from the flame or plasma spray gun through those openings. The thickness of the so sprayed coating may range from 125 to 250 microns.

Subsequent aluminum diffusion coating can be done in many ways. The two following ways are particularly useful.

The nickel-aluminum surface can then be coated by molten aluminum dip to a thickness of 25–50 microns, such as for 30 seconds in molten aluminum at 760° C., after which the dip coat is heat diffused in air for 2 hours at 1,040° C. Alternatively, the coated surface may be coated by procedures of the pack diffusion method. The pack method is described on pages 492–493 of Volume 2 of the Eighth Edition of Metals Handbook, published in 1964 by the American Society for Metals.

A wide range of sheet metal substrate alloy is useful to produce coated metals of excellent resistance to corrosion and erosion by impinging air-exhaust gas mixtures. The sheet metal treated can be a chromium-iron alloy having, by weight, a chromium content of 10 to 40 percent, a nickel content of 0 to 40 percent, a manganese content of 0 to 10 percent, an aluminum content of 0 to 6 percent and an iron content of 35 to 80 percent, the total chromium, nickel, manganese, aluminum and iron content of the alloy being at least 95 percent. More preferably, the alloy is heavier in iron than nickel, and has, by weight, 15–25 percent chromium, 28–36 percent nickel, 0.25–2 percent manganese, 0–2 percent aluminum and 40–55 percent iron. Because of the special coating, the carbon content is not critical as with prior alloy materials used in exhaust manifold reactors.

It has been found that the qualitative superiority in corrosion and erosion resistance of one coated metal coupon over a different coated metal coupon when tested by exposure under similar conditions of valve port exposure for an extended time under actual exhaust gas reactor operating conditions is the same as the qualitative superiority which is shown when such coupons have been suspended for an extended time in the static air atmosphere inside a muffle furnace heated to a temperature of 1,095° C.

EXAMPLE

The following tests, illustrating the subject invention, are given without any intention that the invention be limited thereto.

The first tests shown below (A, B and C) were made under actual reactor-operating conditions.

A test reactor core was devised to test the comparative erosion resistances of base metal coupons having various protective coatings.

FIG. 1 is a section through the middle of the type of test reactor used. FIG. 2 is a section across the reactor core to show how metal coupons were used for test purposes in the reactor.

Referring in detail to the drawings, exhaust ports 1 extend from the engine through an outer shell 2 and a reactor core 3. End plates 4 seal the ends of the outer shell 2 and by means of spacers (not shown) hold the reactor core 3 positioned inside the outer shell 2. The reactor core 3 is partially closed at its ends by end plates 5, the rest of the ends of the reactor core being open. A reactor exhaust port 6 is provided in the outer shell 2 to exhaust reacted mixture from the reactor.

The reactor core 3 is provided with deflector plates 7 in a sealing engagement with the end plates 5 and in an alignment perpendicular to the axis of the exhaust ports 1. Guide tracks 8 are welded to the interior of the reactor core 3, these tracks being grooved and having end stops 9 so that the deflector plates 7 can be inserted in the guide tracks 8 to the end stops 9, and so that the deflector plates are readily withdrawable for examination whenever the end plates 4 with spacers have been removed.

The reactor core, exclusive of the deflector plates 7, was made from 1.5 mm. thick Incoloy 800 alloy having on all surfaces a diffused aluminum coating. Incoloy 800 is 46% Fe, 32% Ni, 20.5% Cr, 0.04% C, 0.30% Ti, 0.75% Mn, 0.35% Si and trace others. The provision of the guide tracks with insertable and removable deflector plates was special for the purposes of this test. The individual deflector plates were each test samples for this experiment.

Two 50 mm. × 100 mm. × 1.5 mm. plates of Incoloy 800 were plasma jet-sprayed with a mixture of 80 percent by weight of elemental nickel and 20 percent by weight of elemental aluminum to a coating thickness of 125 microns. Both coated plates were aluminum dipped at 760° C. to a coating thickness of 50 microns. One plate, here designated plate A, was subsequently air diffusion treated for 2 hours at 1,040° C. The other plate, here designated plate B, was not further treated.

Plate A and plate B were inserted in the test reactor core as the deflector plates 7 of the drawings. The reactor was assembled and attached on a 1967 Chevrolet V-8 engine mounted on a test stand. This engine had a swept displacement of 283 cubic inches and a compression ratio of 9.25. The engine was outfitted with the air injection system which Chevrolet provided for that model year.

The engine was operated at 3,600 r.p.m. under a load which required the engine to generate 85 horsepower, a condition equivalent to running an automobile at 80 miles per hour up a small grade. This condition generated reactor temperatures in the 960°–1,010° C. range. The fuel used was gasoline containing 3 grams of tetraethyllead/gallon added to it.

The test was run for 283 hours, the equivalent of about 22,000 miles of automobile operation. The plates were then withdrawn from the reactor for examination.

Plate A was in excellent condition, with no erosion or excessive oxidation. Plate B was severely eroded where it was opposite the valve port, and it had lost 600 microns of cross section thickness.

Another 50 mm. × 100 mm. × 1.5 mm. plate of Incoloy 800 was dipped in aluminum at 760° C. to a coating thickness of 125 microns. This plate was then air diffused for 2 hours at 1,040° C. This plate, designated plate C, represented prior art as disclosed by Douthit in U.S. application Ser. No. 716,260, filed Mar. 8, 1968. This plate was tested in a reactor similar to that in which plates A and B were tested, using the same engine under like operating conditions. This plate was eroded 175 microns after 285 hours of operation, 225 microns after 388 hours of engine operation.

Comparison tests of coating systems were also made in an electric heated muffle furnace. Coated 50 mm. × 100 mm. × 1.5 mm. coupons of Incoloy 800 were prepared as follows for tests.

Sample D was plasma jet sprayed with a 125 micron coating from an elemental mixture of 80% Ni and 20% Al.

Sample E was sprayed like D and then heat treated under vacuum for 1 hour at 1,040° C.

Sample F was sprayed like D and then dipped in aluminum at 760° C. so that an added 50 micron coating is acquired, and subsequently air diffused for 2 hours at 1,040° C.

These samples were heated in air in an electric muffle furnace at 1,095° C. with the following comparative results:

| Sample | Hr. in Furnace | % of Coating lost | KHN* After heat |
|---|---|---|---|
| D | 91 | 50–75% | 210–320 |
| E | 42 | 60–90% | 126–150 |
| F | 91 | virtually intact | 450–550 |

*KHN = Knoop Hardness Number of surface coating—method of determination described on page 1-24 of Kent's Mechanical Engineer's Handbook, Twelfth Edition, John Wiley and Sons, Inc. (1967). Higher KHN's indicate harder materials. For reference, most stainless steels have a KHN in the 200–300 range while quartz may have a KHN of up to about 700. As can be seen from the above table, the hardness of the special coating of the subject invention is much higher than similar coatings and helps to account for its improved resistance to corrosion and erosion.

By metallographic observation it was noted that after the furnace heating the coatings of sample D and sample E had a lamellar heterogeneous structure, while the coating of sample F had a homogeneous structure with practically no lamellar structure. This also is a factor in the improved performance of the subject coated alloys.

Although the invention has been described and exemplified by way of specific embodiments, it is to be understood, that it is not limited thereto. As will be apparent to those skilled in the art, numerous modifications and variations of the embodiments illustrated above may be made without departing from the spirit of the subject invention.

What is claimed is:

1. A process for producing sheet metal substrates having high corrosion and erosion resistance to hot exhaust gases of internal combustion engines which comprises:
    A. melt spraying a coating about 125–250 microns thick of a mixture of about 70–90 weight percent nickel and about 10–30 weight percent aluminum on sheet metal substrates of a chromium-iron alloy consisting essentially of, by weight, 10–40 percent chromium, 0–40 percent nickel, 0–10 percent manganese, 0–6 percent aluminum and 35–80 percent iron, and
    B. diffusion coating the nickel-aluminum coating with aluminum to a thickness of at least 25 microns.

2. The process of claim 1 wherein said chromium-iron alloy consists essentially of, by weight, 15–25 percent chromium, 28–36 percent nickel, 0.25–2.0 percent manganese, 0–2.0 percent aluminum and 40–55 percent iron.

3. The process of claim 2 wherein said aluminum diffusion coating is 25–50 microns thick.

4. The process of claim 3 wherein the melt spraying in (A) consists of flame-spraying the molten nickel-aluminum from a flame-spray gun.

5. The process of claim 3 wherein the melt spraying in (A) consists of plasma jet-spraying the molten nickel-aluminum from a plasma gun.

6. The process of claim 3 wherein the sheet metal substrates comprise the surfaces of an exhaust manifold reactor inner chamber which deflect the initial exhaust gas impingement from an internal combustion engine.

7. The process of claim 3 wherein the chromium-iron alloy consists essentially of, by weight, 46 percent iron, 32 percent nickel, 20.5 percent chromium, 0.04 percent carbon, 0.30 percent titanium, 0.75 percent manganese, 0.35 percent silicon.

* * * * *

Dedication 3,640,755.—*Walter J. Barth*, Hockessin, Del. COATINGS FOR AUTOMOTIVE EXHAUST GAS REACTORS. Patent dated Feb. 8, 1972. Dedication filed June 28, 1973, by the assignee, *E. I. du Pont de Nemours and Company*.

Hereby dedicates to the Public the entire term of said patent.

[*Official Gazette November 6, 1973.*]